(12) United States Patent
Choudhary et al.

(10) Patent No.: US 11,876,650 B2
(45) Date of Patent: Jan. 16, 2024

(54) MULTI-STAGE EQUALIZER FOR INTER-SYMBOL INTERFERENCE CANCELLATION

(71) Applicant: Cadence Design Systems, Inc., San Jose, CA (US)

(72) Inventors: Prashant Choudhary, Milpitas, CA (US); Nanyang Wang, Cupertino, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/978,422

(22) Filed: Nov. 1, 2022

(65) Prior Publication Data

US 2023/0119007 A1 Apr. 20, 2023

Related U.S. Application Data

(63) Continuation of application No. 17/265,294, filed as application No. PCT/US2019/044491 on Jul. 31, 2019, now Pat. No. 11,502,879.

(Continued)

(51) Int. Cl.
*H04L 25/03* (2006.01)
(52) U.S. Cl.
CPC .. *H04L 25/03076* (2013.01); *H04L 25/03318* (2013.01)
(58) Field of Classification Search
CPC . H03H 7/30; H03K 5/159; H04B 1/10; H04B 1/16; H04L 1/00; H04L 5/12;
(Continued)

(56) References Cited

U.S. PATENT DOCUMENTS 6,754,294 B1 * 6/2004 Adireddy .......... H04L 25/03057
375/348
6,882,690 B1 4/2005 Berggren et al.
(Continued)

FOREIGN PATENT DOCUMENTS

CN 101578807 A 11/2009
CN 101958862 A 1/2011
(Continued)

OTHER PUBLICATIONS

Ariel L. Pola et. al, "A New Low Complexity Iterative Equalization Architecture for High-Speed Receivers on Highly Dispersive Channels: Decision Feedforward Equalizer (DFFE)", IEEE 2011. 4 pages.

(Continued)

*Primary Examiner* — Shawkat M Ali
(74) *Attorney, Agent, or Firm* — Mark H. Whittenberger; Holland & Knight LLP

(57) ABSTRACT

An equalizer includes a first feed-forward stage that provides a measure of low-frequency ISI and a second feed-forward stage that includes a cascade of stages each making an ISI estimate. The ISI estimate from each stage is further equalized by application of the measures of low-frequency ISI from the first feed-forward stage and fed to the next in the cascade of stages. The ISI estimates from the stages thus become progressively more accurate. The number of stages applied to a given signal can be optimized to achieve a suitably low bit-error rate. Power is saved by disabling stages which are not required to meet that goal.

20 Claims, 5 Drawing Sheets

Related U.S. Application Data

(60) Provisional application No. 62/778,622, filed on Dec. 12, 2018, provisional application No. 62/765,109, filed on Aug. 17, 2018.

(58) Field of Classification Search
CPC ..... H04L 25/03; H04L 25/04; H04L 25/0328; H04L 25/03076; H04L 25/03318; H04L 27/01
USPC ............. 375/147, 229–235, 265, 346, 350
See application file for complete search history.

(56) References Cited

U.S. PATENT DOCUMENTS

| | | | |
|---|---|---|---|
| 6,956,893 B2 | 10/2005 | Frank et al. | |
| 9,014,313 B2* | 4/2015 | Chmelar | H04L 25/03057 375/348 |
| 9,041,313 B2 | 5/2015 | Mednik | |
| 11,502,879 B2* | 11/2022 | Choudhary | H04L 25/03318 |
| 2002/0131489 A1 | 9/2002 | Allpress et al. | |
| 2006/0093028 A1 | 5/2006 | Balan et al. | |
| 2008/0008233 A1 | 1/2008 | Cohen | |
| 2010/0034253 A1 | 2/2010 | Cohen | |
| 2010/0046683 A1 | 2/2010 | Beukema et al. | |
| 2011/0051864 A1 | 3/2011 | Chalia et al. | |
| 2012/0027074 A1 | 2/2012 | Raghavan et al. | |
| 2013/0230093 A1 | 9/2013 | Aziz et al. | |
| 2013/0243066 A1 | 9/2013 | Palusa et al. | |
| 2015/0256363 A1 | 9/2015 | Shvydun et al. | |

FOREIGN PATENT DOCUMENTS

| | | |
|---|---|---|
| CN | 102882817 A | 1/2013 |
| EP | 2417738 B1 | 3/2019 |

OTHER PUBLICATIONS

EP Extended European Search Report dated Apr. 7, 2022 re: EP Appln. No. 19850646.1. 8 pages.

Maggio and Rodriguez, "A Novel MLSD Receiver Architecture for Nonlinear Channels," 15th Argentine Symposium on Technology, AST 2014, 12 pages.

Maggio et al., "Maximum Likelihood Sequence Detection Receivers for Nonlinear Optical Channels," Hindawi Publishing Corp., Journal of Electrical and Computer Engineering, ,vol. 2015, Article ID 736267, 2015, 12 pages.

Notification of Transmittal of the International Search Report and the Written Opinion of the International Searching Authority, or the Declaration dated Oct. 29, 2019 re: In'tl Appln. No. PCT/US2019/044491. 8 Pages.

Wolfgang H. et al., "Iterative Equalization with Adaptive Soft Feedback", IEEE Transaction on Communications, Sep. 2000. 5 pages.

Wu et al., "Low Complexity Soft-input Soft-output Block Decision Feedback Equalization," IEEE Journal on Selected Areas in Communications, 2007, 9 pages.

EP Response filed Nov. 4, 2022 in Response to the Extended European Search Report dated Apr. 7, 2022 and the Official Communication Pursuant to Rules 70(2) and 70a(2) EPC dated Apr. 26, 2022 re: EP Appln. No. 19850646.1. 39 pages.

\* cited by examiner

MULTI-STAGE EQUALIZER FOR INTER-SYMBOL INTERFERENCE CANCELLATION

BACKGROUND

Binary communication systems represent information using just two symbols—e.g. relatively high and low voltages—to alternatively represent a logical one and a logical zero (i.e. 1 or 0). The number of levels used to represent digital data is not limited to two, however. For example, a type of signaling referred to as PAM-4 (for 4-level pulse-amplitude modulation) provides for four discrete pulse amplitudes (voltages) to convey two binary bits of data per symbol (i.e., 00, 01, 10, or 11). A series of symbols, each representing one of a set of possible symbol values, can thus be communicated as a voltage signal that transitions between levels in a manner that reflects the series. The time each voltage level is held to represent a symbol is termed the "symbol time" and the speed with which symbols can be communicated is termed the "symbol rate." A receiver recovers a set of symbols from a signal by comparing the voltage during each symbol time against one or more reference-voltage levels to distinguish between symbols.

High performance communication channels suffer from many effects that degrade symbols, and consequently render them difficult to resolve. Primary among them are frequency dependent channel loss (dispersion) and reflections from impedance discontinuities. These effects cause neighboring symbols (voltage levels) to interfere with one another and are commonly referred to collectively as Inter-Symbol Interference (ISI). For example, relatively high-voltage symbols may spread out to raise the level of neighboring lower-voltage symbols; if the resulting voltage distortion is sufficiently high, the lower-voltage symbols may be interpreted incorrectly. Lower-voltage symbols may likewise induce errors in neighboring higher-voltage symbols.

ISI becomes more pronounced at higher signaling rates, ultimately degrading signal quality such that distinctions between originally transmitted symbols may be lost. Some receivers mitigate the effects of ISI using one or more equalizers to reverse the effects of channel distortion. One common type of equalizer, the decision-feedback equalizer (DFE), corrects for ISI imposed on a current symbol by a prior symbol by multiplying the value of the prior symbol by a "tap value" calibrated to account for the ISI and adding the resultant product to the voltage level used to interpret the current symbol. ISI from a prior symbol that tends to raise (lower) the level of the current symbol is thus offset by a similar rise (fall) in the reference against which the current symbol is evaluated. The same principle can be extended to multiple preceding symbols.

In high-speed systems it can be difficult to resolve recently received symbols in time to calculate their impact on incoming symbols and apply the requisite feedback. Symbol pre-decision is used in some DFEs to ease this timing constraint. Each received symbol is ISI-compensated based on hypothetical decision feedback signals and sampled against decision reference levels to make tentative symbol pre-decisions. The decision feedback loop is then used to select among the tentative pre-decisions after the prior symbol is resolved.

The use of pre-decisions to delay the need for a final decision on a prior symbol reduces the latency of the decision-feedback loop and helps timing closure of the timing critical path. Unfortunately, this advantage requires increasing the requisite number of samples for each symbol, and thus the required circuit area and power. Binary signaling requires two tentative decisions for each prior symbol under consideration. PAM-4 signaling requires twelve tentative decisions, which results in significantly higher power usage and circuit area relative to binary signaling and makes timing closure more difficult.

BRIEF DESCRIPTION OF THE DRAWINGS

The detailed description is illustrated by way of example, and not by way of limitation, in the figures of the accompanying drawings and in which like reference numerals refer to similar elements and in which.

DETAILED DESCRIPTION

Figure 1:
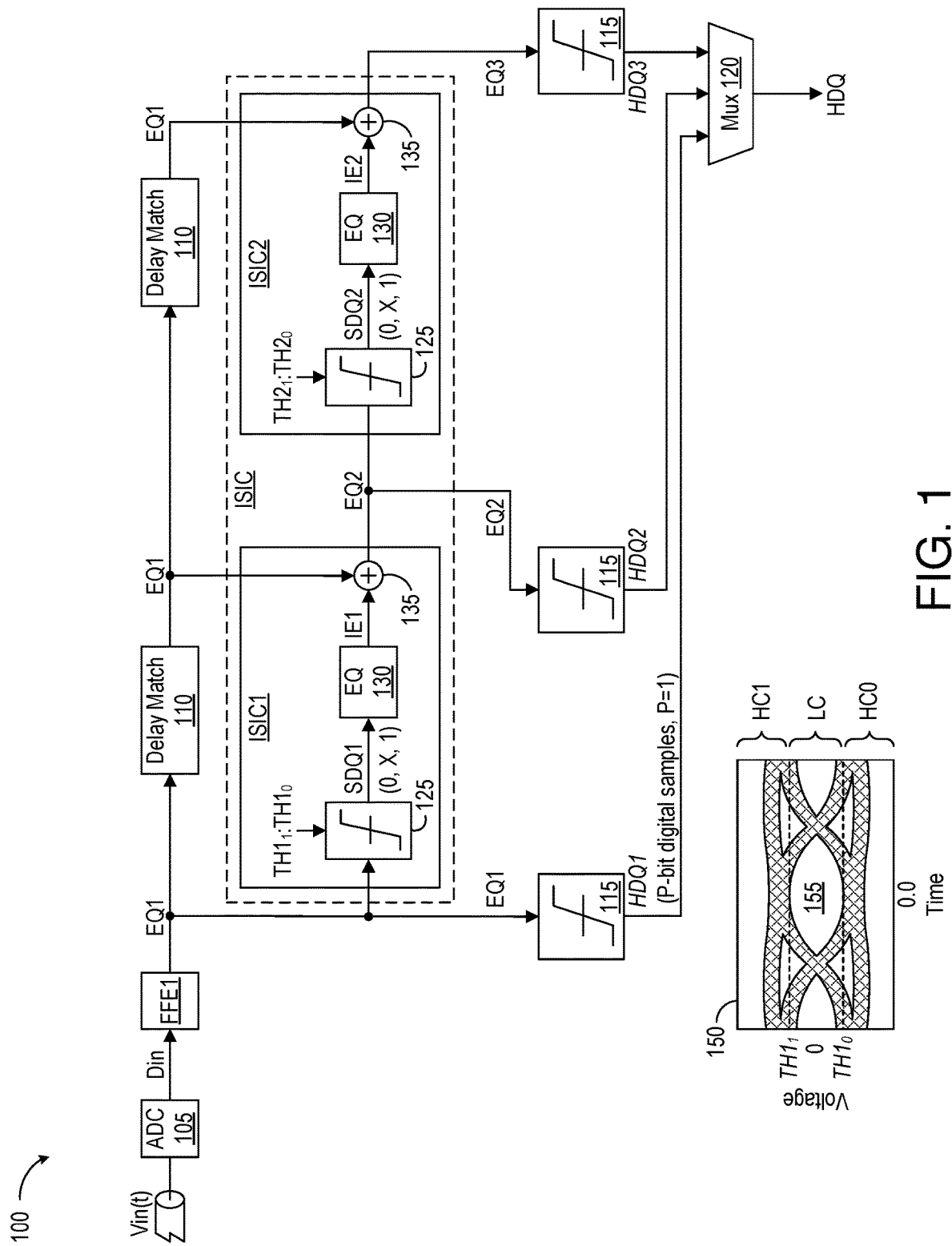
FIG. 1 depicts a receiver 100 that combines ISI estimates with feed-forward equalization to accurately and efficiently digitize an analog, continuous-time input signal Vin(t) distorted by inter-symbol interference (ISI).

FIG. 1 depicts a receiver 100 that combines estimates of inter-symbol interference (ISI) with feed-forward equalization to accurately and efficiently digitize an analog, continuous-time input signal Vin(t) distorted by the ISI. An analog-to-digital converter (ADC) 105 converts signal Vin(t) into a digital input signal Din. A feed-forward equalizer FFE1 equalizes input signal Din to produce an equalized signal EQ1 that provides a measure of high-frequency components of the ISI. Delay elements 110 provide delayed versions of equalized signal EQ1 each synchronized to one stage of a cascaded ISI canceller ISIC. Each stage of ISI canceller ISIC provides high-confidence and low-confidence ISI estimates expressing tentative values of input signal Din, equalizes these tentative values to produce ISI estimates, and combines the ISI estimates with a time-aligned version of equalized signal EQ1 to provide an improved representation of input signal Vin(t). A multiplexer 120 can take a hard-decision output HDQ, a digitized version of input signal Vin(t), from any of three decision circuits 115. One or both stages of ISI canceller ISIC can thus be disabled to save power if not required to establish a desired bit-error rate (BER). Receiver 100 can thus be power optimized for channels of varying quality.

Feed-forward equalizer FFE1 equalizes signal Din responsive to a first set of tap values (not shown). In this context, a "tap value" is a coefficient applied to a symbol propagating through a delay line. The current symbol under consideration is referred to as the "main cursor" and the corresponding tap value the "main tap." Symbols before or after the main cursor are respectively termed pre-tap and post-tap and may be designated by the number of symbol times they are separated from the main cursor. Given a main symbol $S(n)$ with tap $T(n)$, for example, the prior symbol may be designated $S(n-1)$ and the prior tap $T(n-1)$. Filters and filter taps are well understood by those of skill in the art, so a detailed discussion is omitted.

The leftmost decision circuit 115 produces a binary hard decision HDQ1 for each symbol of equalized signal EQ1. In this context, a "hard decision" is a high-confidence resolution of a symbol from among an expected set of symbol values expressed by the sampled signal. In this binary example, the expected set of symbol values consists of binary one and zero. Decision circuit 115 can thus resolve a given symbol as either a binary one or a binary zero. For short channels filter FFE1 may provide enough equalization that merely sampling signal EQ1 will produce a sufficiently low BER. In that case multiplexer 120 can select signal HDQ1 as receive data HDQ and the unused elements of receiver 100 can be disabled to reduce power consumption.

ISI canceller ISIC includes a cascade of stages, two stages ISIC1 and ISIC2 in this embodiment. Considering first stage ISIC1, a decision circuit 125 slices equalized signal EQ1 relative to two reference levels $TH1_1:TH1_0$ to obtain high-confidence decisions and low-confidence decisions. Decisions of low and high confidence resolve a symbol from among a set of symbol values greater in number than what is expressed by the sampled signal. In this example in which equalized signal EQ1 represents binary data, decision circuit 125 designates slices indicative of three values, those with levels greater than $TH1_1$ as high-confidence logic-one decisions, less than $TH1_0$ as high-confidence logic-zero decisions, and levels between $TH1_1$ and $TH1_0$ as low-confidence indeterminant-X decisions that might represent either a logic one or a logic zero.

FIG. 1 includes a waveform diagram 150—a so-called "eye diagram"—of binary equalized signal EQ1 input to decision circuit 125. Diagram 150 is used to illustrate the distinction between high-confidence regions HC1 and HC0 and low-confidence region LC. Signal EQ1 includes an "eye" 155 separating the two voltage ranges that represent the two possible binary values at a sample instant around time zero. Sample values of signal EQ1 that fall within the range encompassing eye 155 do not clearly resolve the symbol under consideration. Decision circuit 125 slices incoming symbols relative to two threshold levels $TH1_1$: $TH1_0$ to place each symbol into one of the three regions. Decision circuit 125 outputs soft-decision signal SDQ1 placing each sliced symbol from signal EQ1 into one of the high- or low-confidence regions.

Confidences specified as "high" or "low" represent relative values, with decision circuit 125 producing outputs representative of just two levels in this example. Decision circuits in accordance with other embodiments can produce outputs representative of more and different confidence levels in other embodiments. The voltage range of a decision circuit might be spanned by e.g. five or seven regions of confidence, the region of lowest confidence bounding zero volts and regions of progressively higher confidence toward the high and low voltage extremes. One such embodiment is discussed below in connection with FIG. 4.

An equalizer 130 equalizes soft-decision signal SDQ1 to produce a second equalized signal EQ2, a second equalized version of the input signal and estimate of ISI. Equalizer 130 applies full tap values to high confidence decisions to offset interference from aggressor symbols. Equalizer 130 applies scaled-down tap values (e.g. no offset) to low-confidence decisions to limit error propagation. An arithmetic operator 135 combines the resultant ISI estimate IE1 with a time-aligned version of equalized signal EQ1 to produce a second equalized signal EQ2. The delay imposed by delay element 110 on signal EQ1 matches the symbol timing within stage ISIC1.

In this example, equalizer stage FFE1 cancels relatively low-frequency ISI, which is to say that stage FFE1 cancels the tails of the single-bit response of the channel by which signal Vin(t) arrives. The output of stage FFE1, and similarly delay element 110, is thus a measure of higher-frequency ISI that can be employed to reduce the BER of stage ISIC1. If equalized signal EQ2 from stage ISIC1 produces a sufficiently low BER then multiplexer 120 can be controlled to select the output HDQ2 from a second of decision circuits 115 as receive data HDQ. As before, any unused elements of receiver 100 can be disabled. Receiver 100 can thus be power optimized for channels of varying quality.

The output from stage ISIC1 may have an undesirably high BER, such as for relatively long channels. In that case the second stage ISIC2 can be engaged to further reduce the BER. Stages ISIC1 and ISIC2 are similar in this embodiment. The stages differ, however, in the levels used to distinguish high-confidence decisions from low-confidence decisions. Each successive stage of equalizer ISIC receives an equalized signal with a lower BER than the one preceding. The levels employed to distinguish decisions reflect the resultant changes in decision boundaries. Decision circuit 125 in stage ISIC2, for example, slices equalized signal EQ2 to place them relative to reference levels $TH2_1:TH2_0$ to produce a second series of high-confidence and low-confidence decisions SDQ2. The low-confidence central region LC for stage ISIC2 spans a different range of amplitudes than region LC from preceding stage ISIC1. Second stage ISIC2 produces another ISI estimate IE2, which is combined with yet another delayed version of equalized signal EQ1 to produce a third equalized signal EQ3. Multiplexer 120 can select the output HDQ3 from a third of decision circuits 115 as receive data HDQ.

Decision circuit 125 is a soft-decision slicer in this example but can be e.g. a hard-decision slicer, a most-significant-bit (MSB) slicer, a decision-feedback equalizer (DFE), a maximum-likelihood sequence detector (MLSD), or a maximum a posteriori probability (MAP) detector. Moreover, different ISI estimating stages ISIC #can use different forms of decision circuits and equalizers, and one or more additional ISI estimators with the same or fewer stages than ISI canceller ISIC can be included in parallel with the one shown. Each decision circuit 115 is a hard slicer in this embodiment but can otherwise be e.g. a DFE, an MLSD, or a MAP detector.

Figure 2:
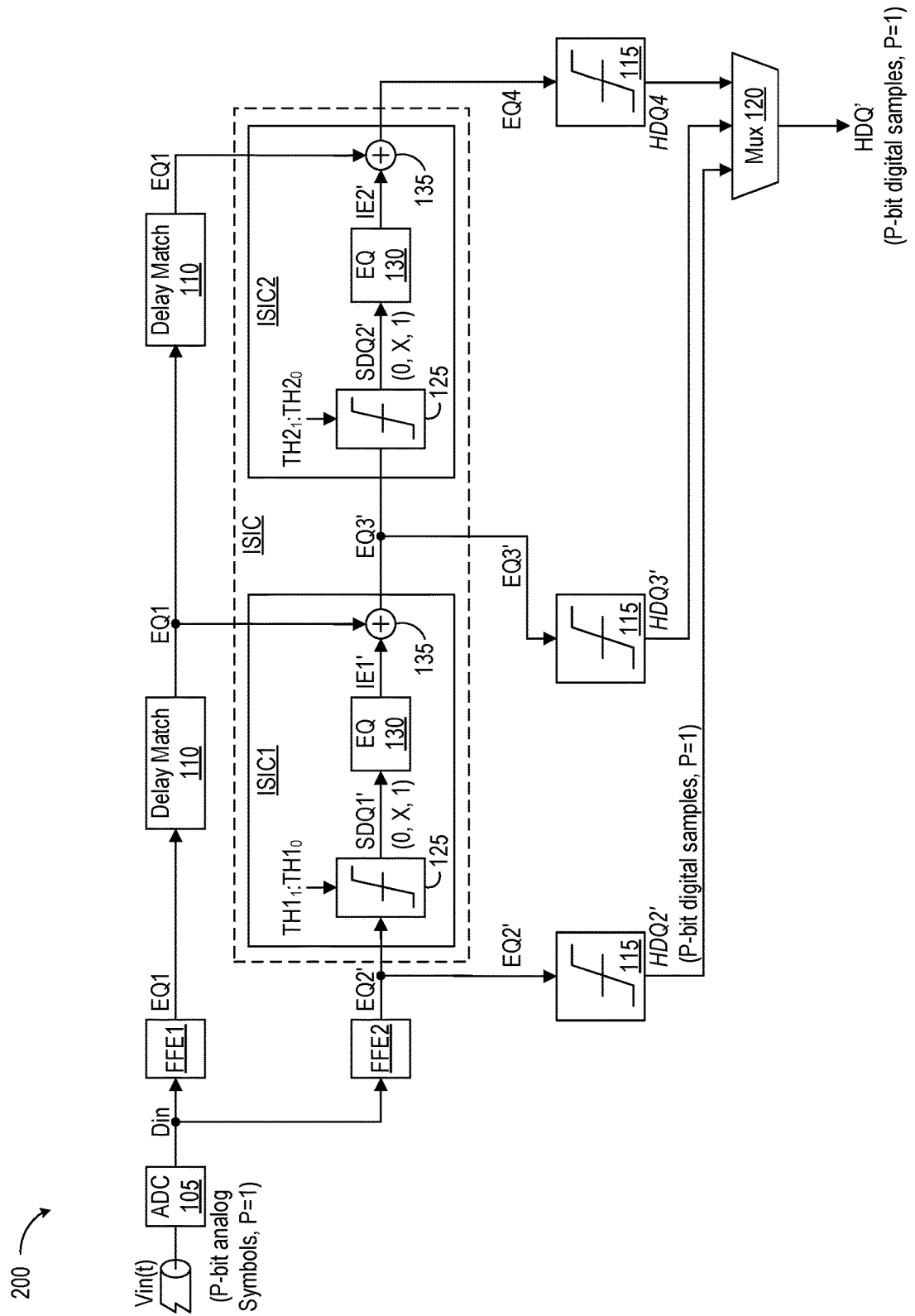
FIG. 2 depicts a receiver 200 that combines ISI estimates with feed-forward equalization to accurately and efficiently digitize an analog, continuous-time input signal Vin(t) distorted by ISI.

FIG. 2 depicts a receiver 200 that combines ISI estimates with feed-forward equalization to accurately and efficiently digitize an analog, continuous-time input signal Vin(t) distorted by ISI. Receiver 200 is much like receiver 100 of FIG. 1, with like-identified elements being the same or similar. Receiver 200 differs from receiver 100 in that the input of ISI canceller ISIC comes from a second feed-forward equalizer FFE2 that delivers a second equalized version of the input signal EQ2'. Cascaded ISI-estimation stages ISIC1 and ISIC2 work as detailed previously to produce decisions SDQ1' and SDQ2', ISI estimates IE1' and IE2', and equalized signals EQ3' and EQ4. Multiplexer 120 selects from hard decisions HDQ2', HDQ3', and HDQ4 depending upon the level of equalization required to obtain a desired symbol rate and BER. In other embodiments, ISI canceller ISIC can produce ISI estimates from equalized signal EQ2' and one or more additional equalized signals (e.g. equalized signal EQ1).

Figure 3:
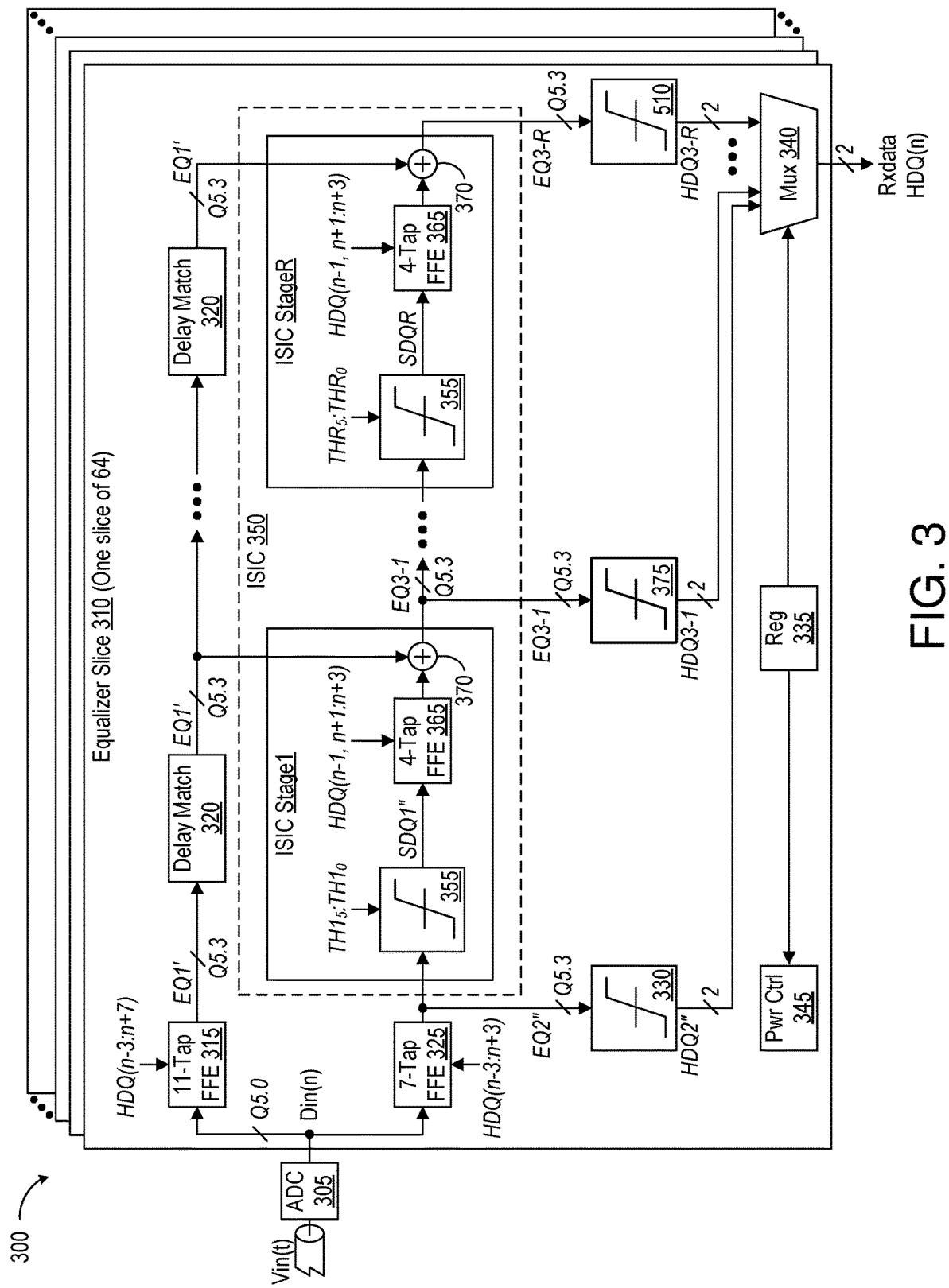
FIG. 3 depicts a PAM4 receiver 300 that receives an analog, continuous-time input signal Vin(t) at a rate 56 GBaud.

FIG. 3 depicts a PAM4 receiver 300 that receives an analog, continuous-time input signal Vin(t) at a rate of 56 GB aud. Each symbol represents one of four pulse amplitudes to convey two binary bits of data per symbol for a data rate of 112 Gbs. An ADC 305 converts signal Vin(t) into a series of six-bit digital values Din(n) that cover a range of voltages from between about 0.3V to −0.3V in sixty-four steps (e.g., from decimal −32 to +31). The port and signal path for signal Din are labeled in a fixed-point numbering format identified by a leading "Q" in which integers preceding and following a decimal identify numbers of integer and fractional bits, respectively, and the sign bit is excluded. The notation Q5.0 thus represents six bits; an implied sign bit, five integer bits, and zero fractional bits.

Receiver 300 includes P slices 310 each operating at a symbol rate of 1/P times that of input signal Vin(t) with a timing offset of one symbol time of input signal Vin(t) relative to the neighboring slice. The collection of P slices 310 thus processes input signal Vin(t) in parallel to relax timing constraints on the individual slices. The number P of slices is sixty-four in this example. A single slice 310 producing a current two-bit data symbol HDQ(n) is illustrated and detailed for brevity. Adjacent slices like the depicted slice 310 resolve previous and subsequent symbols that can be used to compensate for precursor and postcursor ISI. ADC 305 can likewise be divided into slices to ease timing constraints.

Slice 310 includes a feed-forward stage 315 coupled to input node Din(n) to receive the six-bit digital values thereon. Stage 315 is an eleven-tap equalizer with three pre-cursor taps, a main tap, and seven post-cursor taps in this example. The three pre-cursor taps receive resolved data signals HDQ(n−3:n−1) from the three temporally adjacent slices 310 charged with interpreting the three preceding symbols, whereas the seven post-cursor taps receive resolved data signals HDQ(n+1:n+7) from the seven temporally adjacent slices 310 charged with interpreting the seven following symbols. Stage 315 cancels relatively low-frequency ISI, an effect referred to as "channel shortening." Canceling relatively low-frequency ISI leaves a nine-bit equalized signal EQ1' as a measure of relatively high-frequency ISI. Following the above-referenced Q notation, signal EQ1 has nine bits Q5.3, an implied sign bit, five integer bits, and three fractional bits. Delay elements 320 match the timing of equalized signal EQ1 to other equalization stages as detailed below.

Slice 310 includes another feed-forward stage 325 for equalizing input signal Din(n). Stage 325 is a seven-tap equalizer with three pre-cursor taps, a main tap, and three post-cursor taps in this embodiment. FFE stage 325 cancels considerable ISI to produce an equalized signal EQ2". For short channels, equalized signal EQ2" may be adequate for a hard sampler 330 to provide a two-bit, hard-decision data signal HDQ2" with a suitably low BER. In that case a register 335 can be programmed to control (1) a multiplexer 340 to pass signal HDQ2" as output data HDQ(n) and (2) a power controller 345 to power down components of receiver 300 that are not used to equalize input signal Din(n).

Slice 310 includes an ISI estimator 350 that can refine equalized signal EQ2" from stage 325 using the measures of high-frequency ISI on offer as signal EQ1' from equalizer FFE 315 and delay elements 320. ISI estimator 350 is divided into a cascade of R stages Stage1-StageR that provide progressively improved equalization at the cost of progressively increased power consumption. Considering the first stage Stage1, a decision circuit 355 resolves each nine-bit symbol of signal EQ2" into a soft decision SDQ1" placing the symbol into one of seven decision regions, one region for each of the four high-confidence interpretations of the incoming symbol (i.e., binary 00, 01, 10, and 11) and three low-confidence regions that represent uncertain ranges separating the high-confidence regions.

Figure 4:
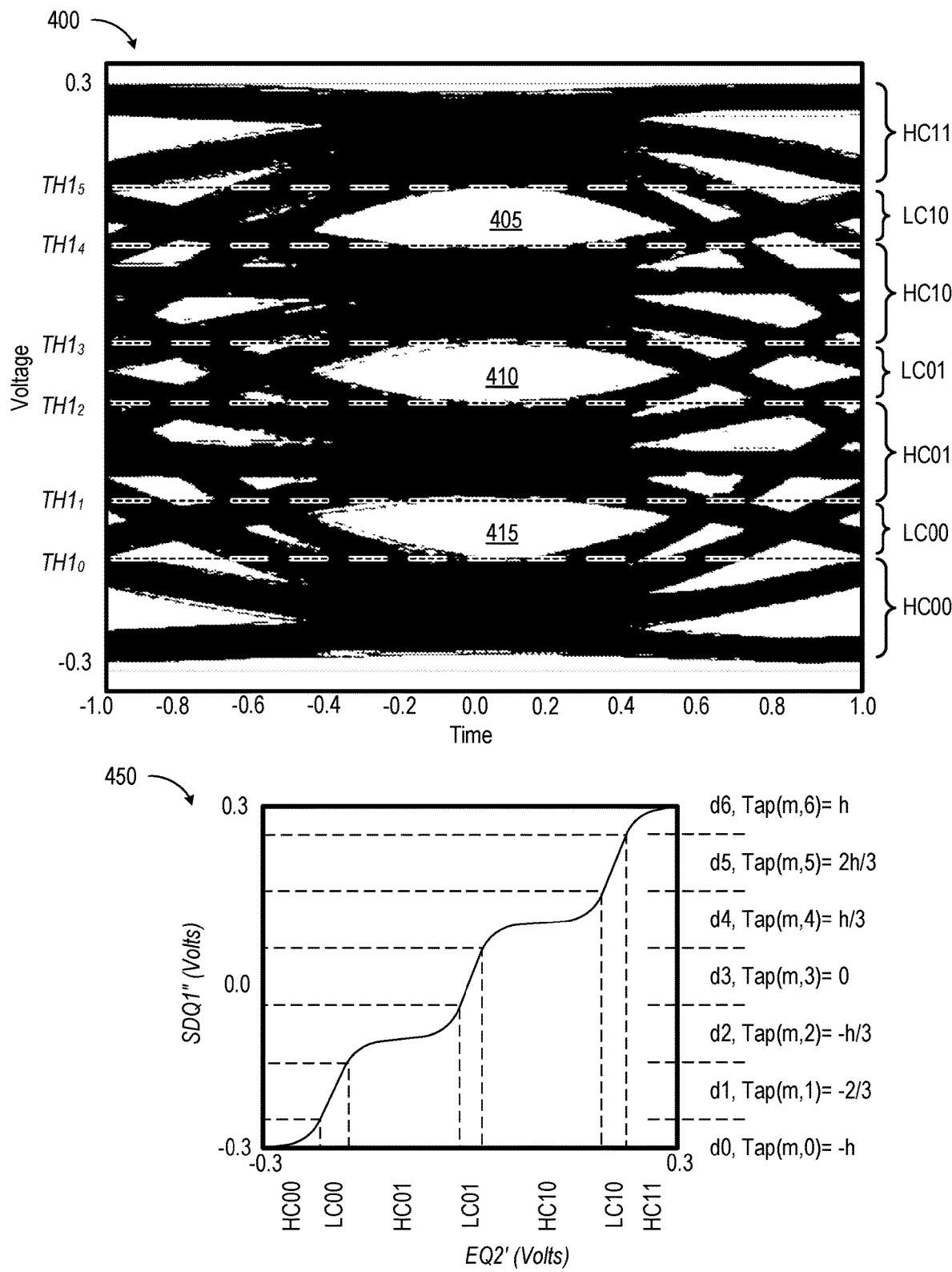
FIG. 4 depicts a waveform diagram 400—a so-called "eye diagram"—of a PAM4 signal input to a decision circuit 355.

FIG. 4 depicts an eye diagram 400 of a PAM4 signal input to decision circuit 355. Diagram 400 is used to illustrate the distinction between high-confidence regions HC[XX] and low-confidence regions LC[YY]. The signal includes three eyes 405, 410, and 415 separating the four voltage ranges that represent the four possible PAM4 symbol values at a sample instant around time zero. Sample values of signal EQ2" that fall within the ranges encompassing eyes 405, 410, and 415 do not clearly resolve the symbol under consideration. Values that fall within low-confidence range LC01 might represent either incoming symbol 10 or 01, for example. Decision circuit 355 slices incoming symbols relative to six threshold levels $TH1_5:TH1_0$ to place each symbol into one of the seven low-confidence and high-confidence regions. Decision circuit 355 outputs soft-decision signal SDQ1" expressing each sampled symbol as one of seven decisions d0-d6. An input/output diagram 450 below eye diagram 400 illustrates the operation of decision circuit 355 in one embodiment.

Returning to FIG. 3, a feed-forward equalizer 365 within ISI estimate stage Stage1 equalizes soft-decision signal SDQ1" responsive to one precursor data symbol HDQ(n−1) and three postcursor data symbols HDQ(n+1:n+3). Stage Stage1 has no main tap in this example, but more, fewer, or different taps can be used here or elsewhere in other embodiments. An arithmetic operator 370 adds the resulting ISI estimate to signal EQ1' from the first delay element 320 to produce an equalized signal EQ3-1 with a lower level of ISI than on signal EQ2".

High confidence decisions are treated to tap values calibrated to fully offset ISI associated with those decisions. Low confidence decisions are treated to scaled tap values that reduce the effects of equalization and thus limit error propagation. The following Table 1 provides suitable tap values for each data level d0-d6, where a tap value of +h fully offsets ISI from a neighboring symbol of an amplitude representing a binary 11.

TABLE 1

| Data Level | Confidence | Tap Value |
|---|---|---|
| d6 | High | +h |
| d5 | Low | +2h/3 |
| d4 | High | +h/3 |
| d3 | Low | 0 |
| d2 | High | −h/3 |
| d1 | Low | −2h/3 |
| d0 | High | −h |

If equalized signal EQ3-1 produces a sufficiently low BER then register 335 can be programmed to instruct multiplexer 340 to pass signal HDQ3-1, the output of another hard sampler 375, as output data HDQ(n). In the alternative, one or more additional ISI-estimation stages can be employed to further refine the signal. Because the equalized signal becomes progressively better as it moves through each stage of ISI estimator 350, the decision circuits 355 in each successive stage apply successively wider low-confidence regions. With reference to the last stage StageR, for example, decision circuit 355 slices an incoming equalized signal relative to six voltage levels $THR_5:THR_0$. The low-confidence regions are greater than those illustrated in FIG.

3 to reflect wider eyes and a reduced BER. As before, power controller 345 can power down circuitry not used to equalize and sample signal Vin(t).

Figure 5:
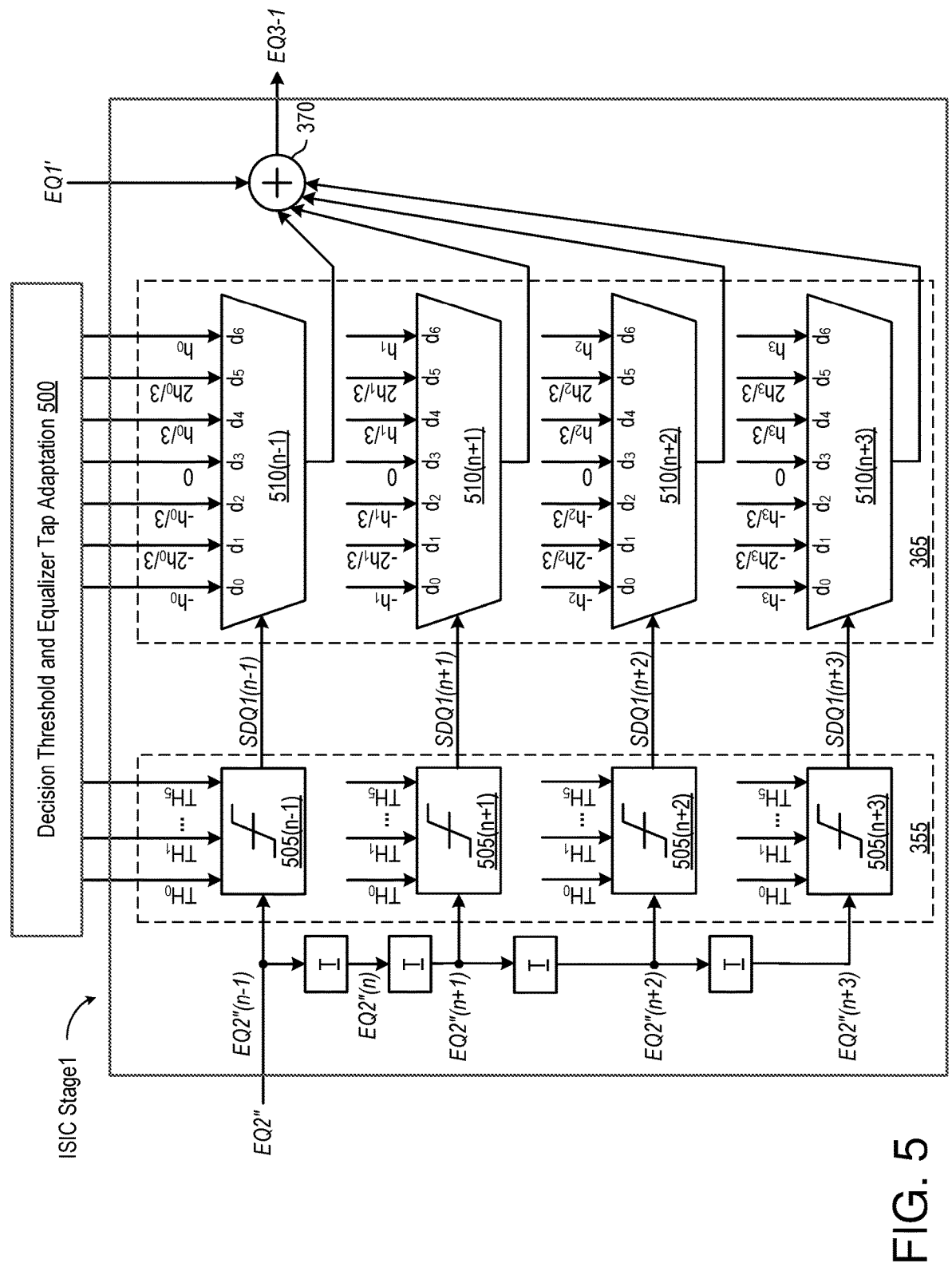
FIG. 5 depicts ISI estimating Stage1 of FIG. 3 with decision threshold and equalizer tap adaptation circuitry 500.

FIG. 5 depicts ISI estimating Stage1 of FIG. 3 with decision threshold and equalizer tap adaptation circuitry 500. Threshold and tap-value selection and adjustment are well known to those of skill in the art so a detailed treatment of circuitry 500 is omitted.

ISIC stage Stage1 includes a series of delay elements T that each impose one symbol-time of delay. These elements provide four differently timed symbols from equalized signal EQ2, one symbol EQ2($n-1$) in service of a precursor tap and three symbols EQ2($n+1:n+3$) in service of three postcursor taps. Decisions from decision circuit 355 are conveyed to equalizer 365, which applies a respective set of tap weights to each of the precursor and postcursor slices. Arithmetic operator 370 combines the equalized outputs from equalizer 365 with equalized signal EQ1 to produce equalized signal EQ3-1.

Decision circuit 355 and equalizer 365 are divided into four taps in this example, one for each precursor and postcursor decision. To this end, decision circuit 355 includes four slicers 505($n-1$; $n+1:n+3$) and equalizer 365 four multiplexers 510($n-1$; $n+1:n+3$). Taking the precursor tap, for example, slicer 505($n-1$) produces first-precursor decisions SDQ1($n-1$). Multiplexer 510($n-1$) applies the appropriate tap weight to each decision and passes on the resultant value to operator 370. The remaining filter taps work the same way except that the applied tap weights are tailored for the impact of the aggressor symbol they are calibrated to counteract.

While the present invention has been described in connection with specific embodiments, variations of these embodiments will be obvious to those of ordinary skill in the art. For example, embodiments of the invention may be adapted for use with multi-PAM signals beyond PAM-4. Moreover, some components are shown directly connected to one another while others are shown connected via intermediate components. In each instance the method of interconnection, or "coupling," establishes some desired electrical communication between two or more circuit nodes, terminals, or ports. Such coupling may often be accomplished using various circuit configurations, as will be understood by those of skill in the art. Therefore, the spirit and scope of the appended claims should not be limited to the foregoing description. Where U.S. law applies, only those claims specifically reciting "means for" or "step for" should be construed in the manner required under the sixth paragraph of 35 U.S.C. § 112.

What is claimed is:

1. A receiver comprising:
   a node to communicate a series of input symbols;
   a first equalizer coupled to the node to produce first equalized symbols responsive to the series of input symbols;
   a delay element coupled to the first equalizer to delay each of the first equalized symbols to produce delayed versions of the first equalized symbols;
   a second equalizer coupled to the node to produce second equalized symbols responsive to the series of input symbols;
   a decision circuit coupled to the second equalizer to issue a high-confidence decision for each of some of the second equalized symbols and a low-confidence decision for each of others of the second equalized symbols;
   a third equalizer to equalize the high-confidence decisions and the low-confidence decisions; and
   an arithmetic operator to combine the delayed versions of the first equalized symbols with the equalized high-confidence decisions and the equalized low-confidence decisions to produce third equalized symbols.

2. The receiver of claim 1, further comprising an analog-to-digital converter to issue the series of input symbols responsive to an analog signal.

3. The receiver of claim 1, further comprising a second decision circuit coupled to the arithmetic operator to issue a second high-confidence decision for each of the third equalized symbols.

4. The receiver of claim 3, further comprising a third decision circuit coupled to the second equalizer to issue a third high-confidence decision for each of the second equalized symbols.

5. The receiver of claim 4, further comprising a multiplexer coupled to the second decision circuit and the third decision circuit, the multiplexer to select between the second high-confidence decisions and the third high-confidence decisions.

6. The receiver of claim 5, further comprising a power controller to disable the second equalizer when the multiplexer selects the third high-confidence decisions.

7. The receiver of claim 3, wherein each of the second high-confidence decisions represents the third equalized symbols as a multi-bit digital value.

8. The receiver of claim 1, wherein the first equalizer has a first number of filter taps, the second equalizer has a second number of filter taps, and the second number differs from the first number.

9. The receiver of claim 8, wherein the second number is less than the first number.

10. The receiver of claim 8, wherein the third equalizer has fewer taps than the first equalizer.

11. The receiver of claim 1, wherein each of the high-confidence decisions represents one of N ranges of symbol amplitudes and each of the low-confidence decisions represents N−1 ranges of symbol amplitudes.

12. The receiver of claim 1, further comprising:
   a second delay element coupled to the first delay element to produce second delayed versions of the first equalized symbols;
   a second decision circuit coupled to the arithmetic operator to issues a second high-confidence decision for some of the third equalized symbols and a second low-confidence decision for others of the third equalized symbols;
   a fourth equalizer to equalize the second high-confidence decisions and the second low-confidence decisions; and
   a second arithmetic operator to combine the second delayed versions of the first equalized symbols with the second equalized high-confidence decisions and the second equalized low-confidence decisions to produce fourth equalized symbols.

13. The receiver of claim 1, wherein the first equalizer, the second equalizer, and the third equalizer are feed-forward equalizers.

14. A method of interpreting an input signal expressing a series of symbols, each of the symbols representing one of a set of possible symbol values, the method comprising:
   equalizing the series of symbols to produce a first equalized series of symbols and a second equalized series of symbols;
   delaying the first equalized series of symbols to produce a delayed equalized series of symbols;

sampling the second equalized series of symbols to obtain high-confidence symbol decisions and low-confidence symbol decisions;
equalizing the high-confidence symbol decisions and the low-confidence symbol decisions; and
combining the first delayed equalized series of symbols with the high-confidence symbol decisions and the low-confidence symbol decisions to produce a third equalized series of symbols.

15. The method of claim 14, further comprising sampling the third equalized series of symbols.

16. The method of claim 14, wherein equalizing the series of symbols to produce the first equalized series of symbols applies a first set of tap values and equalizing the series of symbols to produce the second equalized series of symbols applies a second set of tap values fewer than the first set of tap values.

17. The method of claim 16, wherein the first set of tap values includes a main-tap value and the second set of tap values omits the main-tap value.

18. The method of claim 14, further comprising:
delaying the delayed first equalized series of symbols to produce a second delayed equalized series of symbols;
sampling the third equalized series of symbols to obtain second high-confidence symbol decisions and second low-confidence symbol decisions;
equalizing the second high-confidence symbol decisions and the second low-confidence symbol decisions; and
combining the second delayed equalized series of symbols with the second high-confidence symbol decisions and the second low-confidence symbol decisions to produce a fourth equalized series of symbols.

19. The method of claim 18, further comprising sampling the fourth equalized series of symbols.

20. The method of claim 19, further comprising sampling the third equalized series of symbols and selecting between the sampled third equalized series of symbols and the sampled fourth equalized series of symbols.

* * * * *